United States Patent
Silverman et al.

(10) Patent No.: US 11,150,325 B2
(45) Date of Patent: Oct. 19, 2021

(54) SCALABILITY OF LOCATION IN THE CLOUD WITH ANGLE OF ARRIVAL (AOA) SEARCH ON THE EDGE

(71) Applicant: Cisco Technology, Inc., San Jose, CA (US)

(72) Inventors: Matthew Aaron Silverman, Shaker Heights, OH (US); Santosh Ghanshyam Pandey, Fremont, CA (US); Paul J. Stager, Akron, OH (US); Xu Zhang, Santa Clara, CA (US); Abhishek Mukherji, Fremont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 294 days.

(21) Appl. No.: 16/380,668

(22) Filed: Apr. 10, 2019

(65) Prior Publication Data

US 2020/0326405 A1    Oct. 15, 2020

(51) Int. Cl.
*G01S 5/04* (2006.01)
*G01S 5/02* (2010.01)
*H04L 29/08* (2006.01)
*H04W 88/08* (2009.01)

(52) U.S. Cl.
CPC .............. *G01S 5/04* (2013.01); *G01S 5/0221* (2013.01); *G01S 5/0252* (2013.01); *H04L 67/10* (2013.01); *H04W 88/08* (2013.01)

(58) Field of Classification Search
CPC . G01S 5/04; G01S 5/14; G01S 5/0221; G01S 5/021; G01S 5/0252; G01S 5/02; H04W 64/00

USPC .......................................................... 342/451
See application file for complete search history.

(56) References Cited

U.S. PATENT DOCUMENTS

| | | | |
|---|---|---|---|
| 9,390,302 B2 | 7/2016 | Bassan-Eskenazi et al. | |
| 9,521,520 B2 | 12/2016 | Silverman et al. | |
| 9,864,042 B2 | 1/2018 | Pandey | |
| 2007/0265775 A1* | 11/2007 | Tsai | G01S 19/32 701/469 |
| 2016/0334498 A1* | 11/2016 | Jamieson | G01S 5/04 |
| 2017/0332192 A1* | 11/2017 | Edge | H04W 4/029 |

OTHER PUBLICATIONS

Muhammad Farooq-i-Azam et al.; (Oct. 2016) "Location and Position Estimation in Wireless Sensor Networks", pp. 1-52, Arxiv.org.

\* cited by examiner

*Primary Examiner* — Harry K Liu
(74) *Attorney, Agent, or Firm* — Merchant & Gould P.C.

(57) ABSTRACT

Determining a device's location in a space in real time is computing intensive. To offload some of the workload in conducting this hyperlocation, the access points in the network conduct some of process in determining the location of a device. The cloud determines a restricted AoA search area based on previous client locations. After this determination, a three-dimensional (3D) AoA search is conducted by each AP in the restricted area (restricted by a range of azimuth directions) for a device. Finally, each AP reports a location(s) for the device, which comprises weights for selected angular sectors. The cloud can then construct a probability heat map for location computation from the weights provided from each AP for the device.

16 Claims, 11 Drawing Sheets

SCALABILITY OF LOCATION IN THE CLOUD WITH ANGLE OF ARRIVAL (AOA) SEARCH ON THE EDGE

TECHNICAL FIELD

The present disclosure relates generally to location services in a computer network.

BACKGROUND

A computer network or data network can interface with devices that access the network to receive various services. Some of the services require location information about the device. For example, some of these services may include advertising goods or services located near the device, providing information about another object (e.g., a painting or sculpture in a museum, a location on a battlefield, etc.) near the device, etc. Generally, the location computations are concentrated on a central server in communication with the Access Points (APs) that interface with the devices.

One method for determining location of a device is for an Angle of Arrival (AoA) of the signal to be determined for the device. Then, several different AoAs, from several APs, can be combined to locate (for example, through triangulation) the device. Current AoA location (also referred to as hyperlocation) requires a group of APs to each measure an AoA phase vector for a specific client and send all these AoA phase vectors to a central location server or cloud location server. For each AP, an AoA heat map is then computed based on the measured AoA phase vector. Finally, all heat maps of the grouped APs are combined to locate the client.

Hyperlocation does not scale well because the above correlation computation needs to be conducted for each AP and each client, and for each grid point on a map (or within certain smaller areas). Thus, the location server is attempting to make repeatedly all these computations for numerous APs, devices, networks, grids, which becomes burdensome or too intensive for the processor of the location server.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
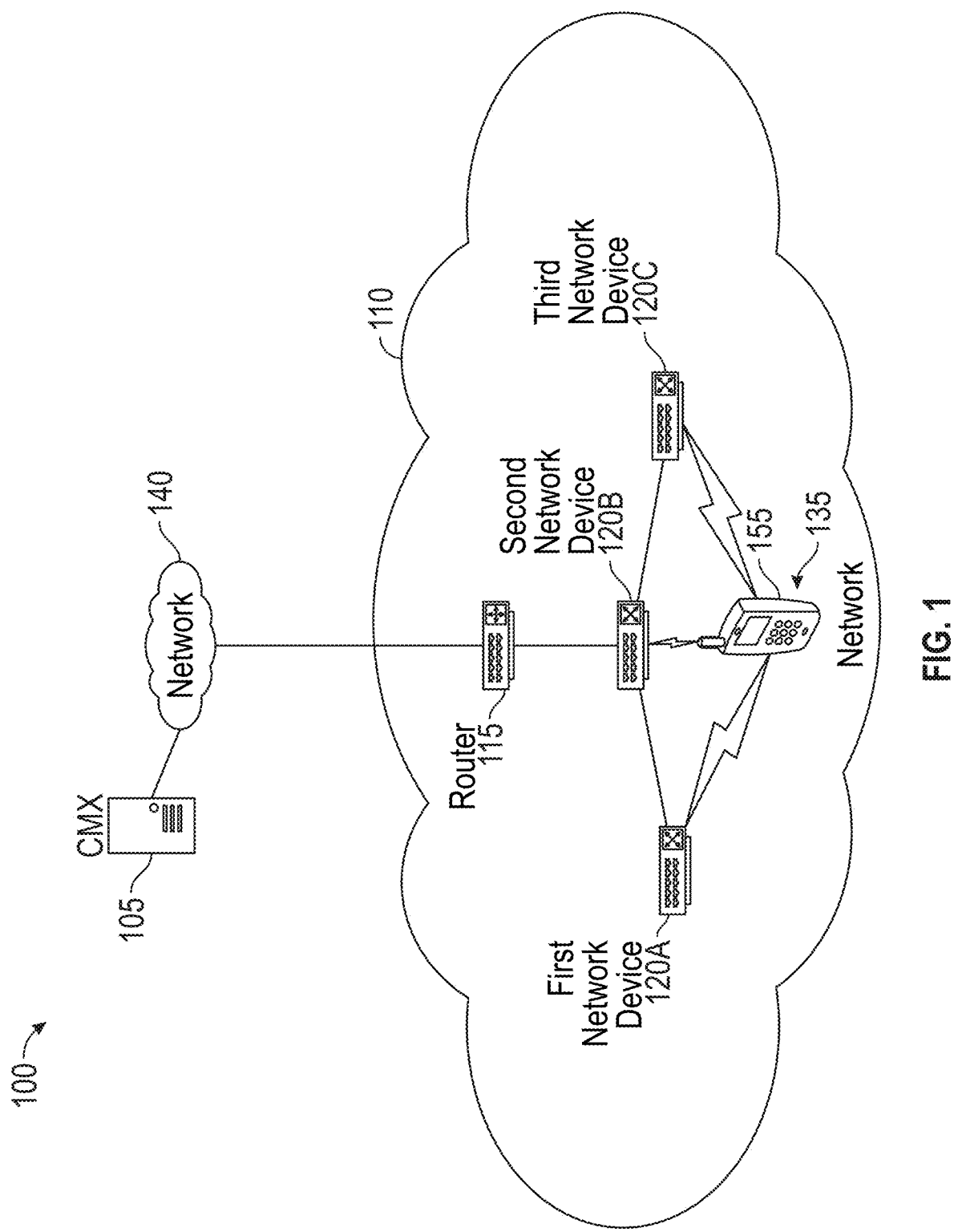
FIG. 1 shows an operating environment for determining a location of a device in a location where at least part of the determination is made at an AP in accordance with aspects of the present disclosure.

Improved scalability of location in the cloud with AoA search on the edge may be provided. First, an AP in a network may determine an AoA information of a first signal from a user device. Next, a second signal having the AoA information may be generated. The second signal may then be sent to a location server. The location server may determine the physical location of the user device based at least on the AoA information and a position of the AP.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Determining a device's location in a space in real time is computing intensive. To offload some of the workload in conducting this hyperlocation, the APs in the network conduct some of process in determining the location of a device. Further, the amount of data sent between the AP and the location server is reduced to ensure the data traffic on the network is lessened.

At a high level, the cloud determines a restricted AoA search area based on previous client locations. After this determination, a three-dimensional (3D) AoA search is conducted by each AP in the restricted area (restricted by a range of azimuth directions) for a device. Finally, each AP reports a location(s) for the device, which comprises weights for selected angular sectors. The cloud can then construct a probability heat map for location computation from the weights provided from each AP for the device.

The process for constructing the location heat map first begins with each AP measuring the AoA phase vectors. After each AP measures the AoA phase vectors, instead of directly sending them to the cloud, each AP now first conducts a 3D AoA search. More specifically, the APs correlate the measured phase vector with ideal phase vectors in a 3D polar coordinate, i.e., each ideal phase vector is computed given an azimuth angle, an elevation angle, and a radius with a coordinate origin at the AP. An example of AoA correlation result include the far-field (with large radius) results, and the near-field (with small radius) results, over both azimuth and elevation angles.

Each AP can then process the 3D AoA correlation results, and generates a set of tuples of <azimuth angle, weight>. The weight is the average of correlation results across all elevation angles and radius for the corresponding azimuth angle. In another embodiment, the weight can be the maximum of correlation results across all elevation angles and radius for the corresponding azimuth angle. After the cloud receives the set of tuples of <azimuth angle, weight> from a group of APs, the cloud reconstructs a probability heat map for each AP based on the set of tuples of <azimuth angle, weight>, by propagating the weight to all grids within the same azimuth angular sector. For azimuth angles that do not have weights, the cloud uses a zero (0) value.

This probability heat map is similar to the AoA correlation heat map in current hyperlocation. However, because all correlation computations are now migrated to the AP, the computational load in the cloud becomes much lighter (which therefore improves the scalability). Finally, probability heat maps of the same client at different APs are combined together for locating the client.

In an example, four APs at 4 corners of a location with clients in the middle. Each AP divides its whole 360-degree azimuth into 60 bins, and selects 20 out of the 60 bins that have largest weights. In other configurations, each AP can divide its whole 360-degree azimuth into 60 bins, and selects 60 out of the 60 bins that have largest weights. To reduce the 3D AoA search complexity (thereby the computational load) at the AP, the cloud can use previous client locations to predict an AoA search area for each AP, and send the restricted search area definition back to each AP. More specifically, predictions can be based on previous locations of past client(s), last round Received Signal Strength Indication (RSSI) measurements, and past AoA measurements. The restricted area translates to a range of azimuth angles for each AP. As a result, each AP can search, for a client, for the AoA search within the corresponding restricted range.

The cloud location controller can configure edge APs to do various levels of processing and various levels of compression of the messaging back to the cloud for the AoA-related location solution. Thus, to improve scalability of hyperlocation in cloud, the embodiments herein comprises an algorithm that migrates AoA correlation computation (which is the most computationally intensive part in hyperlocation) from the cloud to each of the APs. Further, the AoAs can use previous locations of the client to restrict the distributed AoA search to reduce the complexity at each AP.

To achieve both location scale and performance, much of the location solution can be pushed to the edge. However, configuration and system management can be more centrally controlled. Thus, configuration and management of angle-of-arrival location at the edge via cloud. Doing AoA centrally on the cloud is very costly due to high computational load. To improve the process of hyperlocation, the heavy computation is moved to APs at the edge.

A part of the processes conducted by the AP includes collecting data on wireless devices and determining AoA probabilities for edge wireless devices located in physical proximity to the APs (this probability of AoA data is collected and reported per AP). The resolution of the data is dictated by the cloud location system manager settings. A Cloud Location Computation Engine at the location server can receive the messages from edge APs. From this data, the location server can compute the XY location of wireless devices.

A Cloud Location System Manager at the location server can take data from edge APs and can determine optimal resolution of probability data sent from APs. Thus, the location server can determine what the angular resolution that the AP should report (for example, every M degrees (smaller M=>higher resolution)). The location server can also instruct the AP to report the top N probabilities. The larger the value of N, the more complete the data is and the greater the size of the data set to more accurately locate the user device. In some configurations, the location server can instruct the AP to only report sectors with a probability greater than some predetermined threshold value.

The location server can instruct the AP to only do AoA searching over a specific range of angles and no other sets of angles depending on how those angles relate to the floor area of interest. The range of angles to be search can be further divided up in segments that happen every M degrees. Based on the instruction from the location server, the AP separates the search area into segments over which AP searches that can be some number of degrees each. The narrower the segments, the more computation at the AP and potentially more information that is messaged to the location server in the cloud.

The location server may then instruct each AP to report only a subset of those segments that it calculates (the top N segments based on probability that that signal AoA best describes the user's location). Only the top N segments may be reported back to location server from each AP. For example, if N=2, only the segments with the two highest probabilities would be reported to location server along with their probability values (for example, 0.8 and 0.5). The location server then takes the reports from each AP and computes the final XY of the device being tracked.

FIG. 1 shows an operating environment 100 for determining a physical location of a user device 155 that is communicating with APs in the network 110. As shown in FIG. 1, operating environment 100 may comprise a location server 105 and a network 110. Location server 105 may collect information about network 110 and provide that information to provide user experiences through the location server processes and applications. The location information can be used to determine a user's location physically, which may be used to provide some type of experience to the user at the determined location. Location server 105 may also provide those user experiences. Location server 105 may be located inside or outside network 110, for example, in a cloud environment.

Network 110 may comprise, but is not limited to, an enterprise network that may comprise an enterprise's communications backbone that may connect computers and related devices across departments and workgroup networks, facilitating insight and data accessibility. As shown in FIG. 1, network 110 may comprise a router 115, a first network device 120A, a second network device 120B, and a third network device 120C. A plurality of end use devices 135 may be connected to one or more of the network devices 120. The first plurality of end use devices 135 may comprise at least a first end use device 155. Generally, the network devices 120 are access points. An AP 120 can be any hardware device or configured node on a local area network (LAN) that allows a wireless capable device 155 and wired networks to connect through a wireless standard, including Wi-Fi or Bluetooth. APs 120 can feature a processor, radio transmitters, and antennae, which facilitate connectivity between devices 155 and the network 110. APs 120 can be as described in conjunction with FIG. 11.

The router 115 may comprise a Wide Area Network (WAN) router that may connect network 110 to an external network 140, for example, the Internet. When location server 105 is located outside network 110, router 115 may connect location server 105 with network devices (e.g., AP 120) in the network 110.

Each of user devices 155 may comprise, but is not limited to, a cellular base station, a tablet device, a mobile device, a smartphone, a telephone, a remote control device, a set-top box, a digital video recorder, a cable modem, a personal computer, a network computer, a mainframe, a router, or other similar microcomputer-based device capable of accessing and using network 110.

The elements described above of operating environment 100 (e.g., location server 105, router 115, AP 1 120A, AP 2 120B, AP 3 120C, end user device 155, etc.) may be practiced in hardware and/or in software (including firmware, resident software, micro-code, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 11, the elements of operating environment 100 may be practiced in a computing device 1100.

Figure 2A:
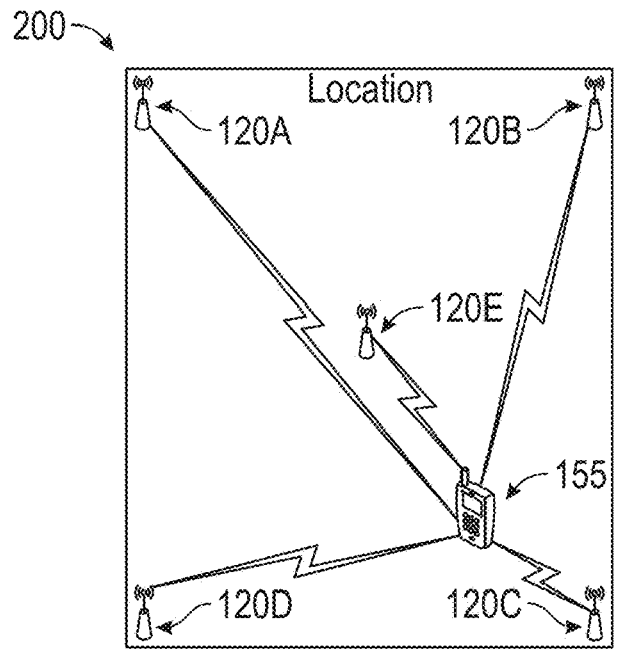
FIG. 2A shows a location where a device is located and where the device's location may be determined from information from APs at the location in accordance with aspects of the present disclosure.

Consistent with embodiments of the disclosure, AP 120 may be in communication with a user device 155 in which the location of the user device 155 is desired. The physical location may be determined from a Real Time Location Service (RTLS). The functions of the RTLS may be split between the APs 120 and the location server 105. Accordingly, as described in greater detail below, embodiments of the disclosure may provide a process by which location services for determining a user device location may be conducted partly by the APs 120 and partly by the location server FIG. 2A shows a location 200 having one or more APs 120A-120E. Each of the APs 120 may be located in a predetermined and known position within location 200. The APs 120 can communicate wirelessly with a mobile device 155. While the mobile device 155 is exemplary of other devices that may be in the location 200, while device 155 is mobile, it may be possible to communicate with other devices that are stationary to determine an initial position of such stationary devices. Each of the APs 120 can conduct at least a portion of the location services as described herein.

Figure 2B:
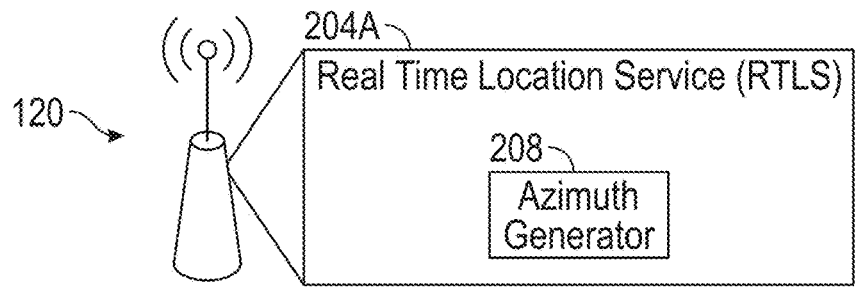
FIG. 2B is an example of an AP in accordance with aspects of the present disclosure.

FIG. 2B shows an example of an AP 120. The AP 120 can include at least a portion of the RTLS 204A. Thus, the RTLS 204A can include at least a portion of the hardware and/or software used to determine the location of a device 155 within location 200. In at least some configurations, the AP 120 may include an azimuth generator 208. The azimuth generator 208 can conduct searches or determine the AoA of a signal from a mobile device 155. The AoA of the signal from the mobile device 155 may be determined by the Time Of Arrival (TOA) and or the RSSI of the signal from the mobile device 155 as it reaches the one or more antennas associated with the AP 120. The azimuth generator 208 can then determine at least one AoA of the signal from the mobile device 155 to be forwarded to the location server 105.

Figure 2C:
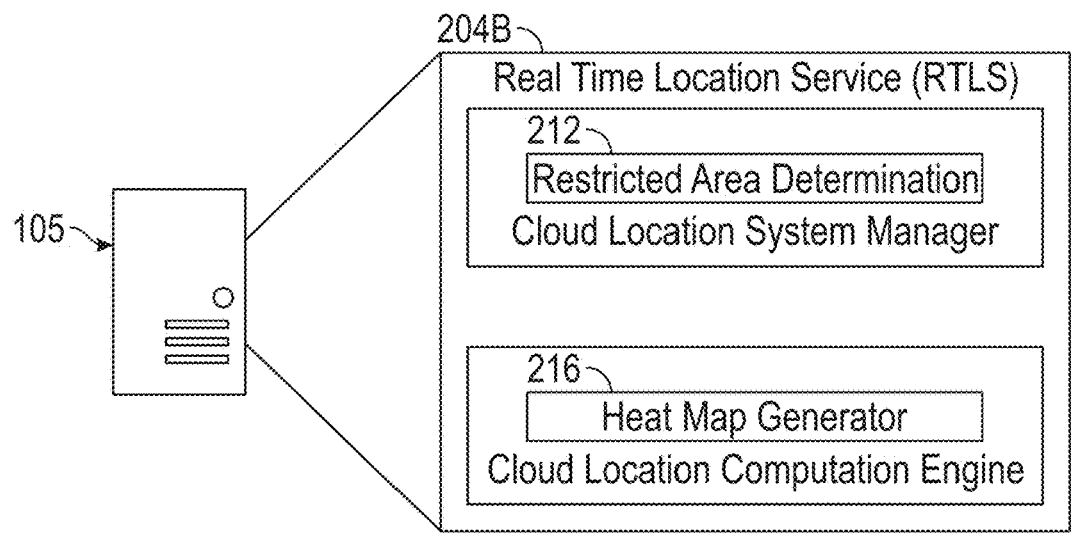
FIG. 2C is an example of a location server in accordance with aspects of the present disclosure.

An exemplary embodiment of the location server 105 may be a shown in FIG. 2C. The location server 105 can include at least a second portion or the remainder of the RTLS 204B. The RTLS 204B can be, within the location server 105, any software and/or hardware. Generally, the RTLS 204B can include a restricted area determination function 212 (which can be a part of a Cloud Location System Manager) and/or a heat map generator 216 (which can be a part of a Cloud Location Computation Engine). The restricted area determination function 212 can determine, from past location determinations of devices within location 200, the one or more azimuth angles to be reviewed by one or more APs 120. As such, the location server 105 can send a restricted area or reduced set of azimuth angles for each AP 122 to review when determining the AOA of the signal from a mobile device 155. The function of the restricted area determination function 212 may be as described hereinafter.

The heat map generator 216 can receive the AOA information from two or more of the APs 120. From the AOA information, the heat map generator 216 may be capable of determining a likely position of the device 155 within the location 200. Thus, the heat map generator 216 is operable to determine a coordinate position based on probabilities and AOAs received from each AP 120. This data helps determine the likely location of the mobile device 155 based on the known locations of the different APs 120.

Figure 3A:
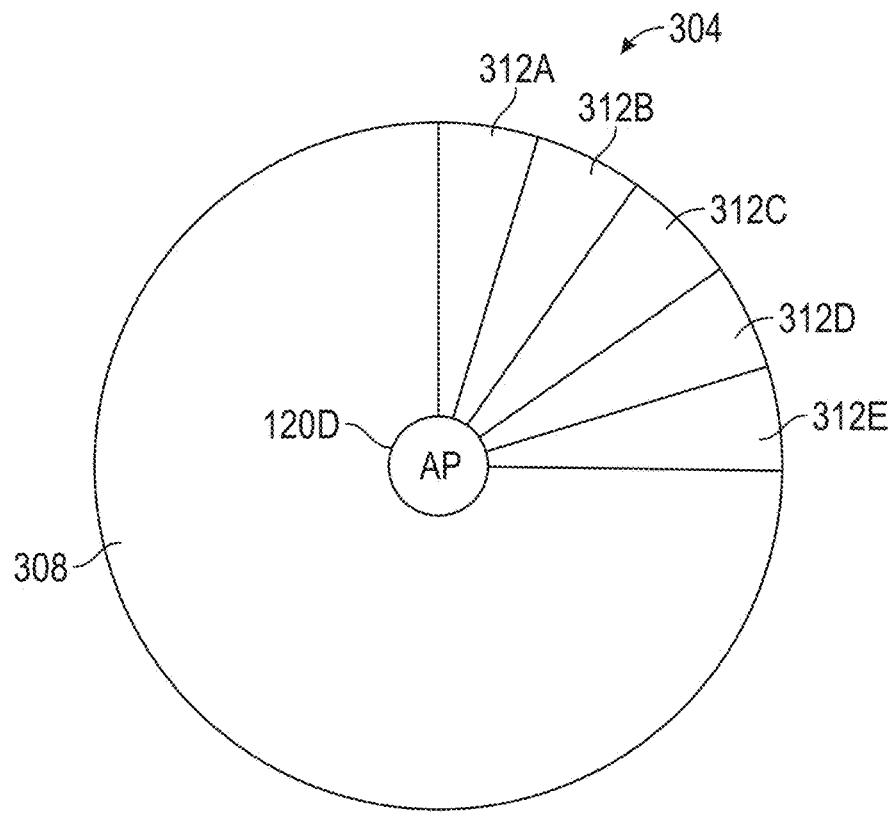
FIG. 3A shows an example restricted search area for a device signal in accordance with aspects of the present disclosure.
Figure 3B:
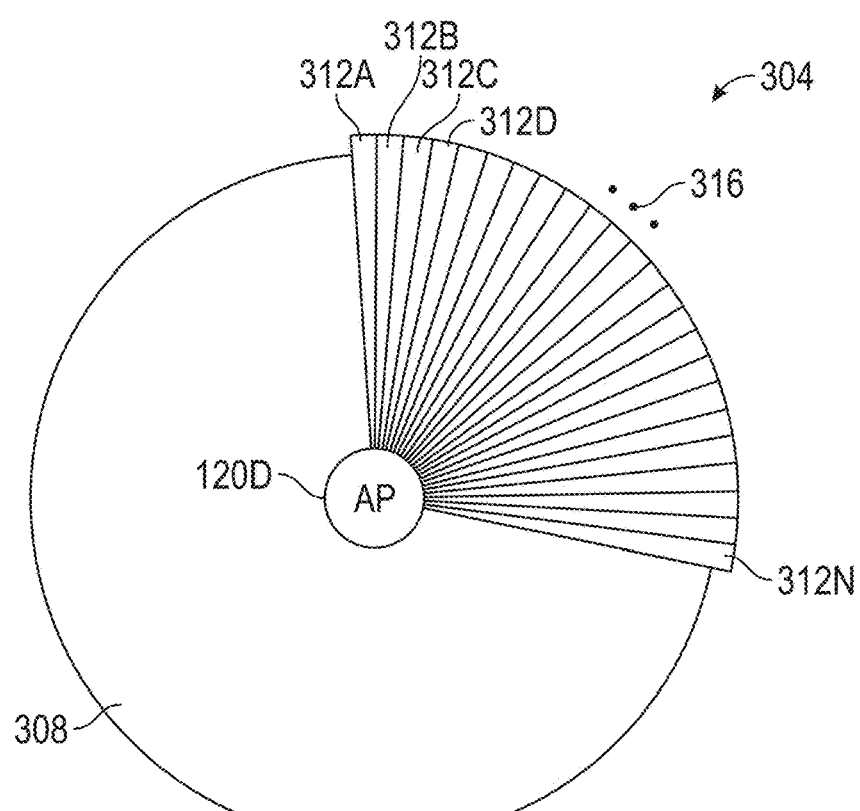
FIG. 3B shows another example restricted search area for a device signal in accordance with aspects of the present disclosure.

An example of the restricted area of evaluation or reduced area of evaluation for an AP 120 may be a shown in FIGS. 3A and 3B. The AP 120, for example AP 120D, may be in a corner of a room that forms location 200. Thus, it may not be possible for AP 120D to receive signals from the locations that would be behind the walls forming the corner of the room of location 200. As such, the location server 105 can determine, from the past location determinations for devices previously in location 200, that signals cannot be received from any of the azimuth angles in portion 308. The location server 105 can then limit or restrict the area of evaluation for AP 120D to the sectors or segments in portion 304. These different portions 304, 308 would be different for the other APs 120A through 120E. Thus, the restricted area 304 would depend on the location and the environment in which the AP 120 is located.

Each restricted area 304 may be further divided into portions or segments 312A through 312E. The number of portions or segments analysed by the AP 120 may be determined based on a setting from the location server 105. The setting may include the number of segments to be used by the AP 120 or a number of degrees assigned to each segment in the area 304. For example, the location server 105 may instruct the AP 120 to use five segments 312A through 312E. In other configurations, the location server 105 can separate the restricted area 304 into sections of 20°, for example. Regardless, using the segments instead of analysing each degree of the azimuth reduces the amount of processing conducted by the AP 120, as the AP does not need to make determinations at more granular level. However, it may be possible to have more granular segments, as shown in FIG. 3B. In that configurations, the segments may be a more numerous set of segments 312A-312N. There can be more or fewer sectors than those shown in FIGS. 3a and 3B, as represented by ellipses 316.

Figure 4:
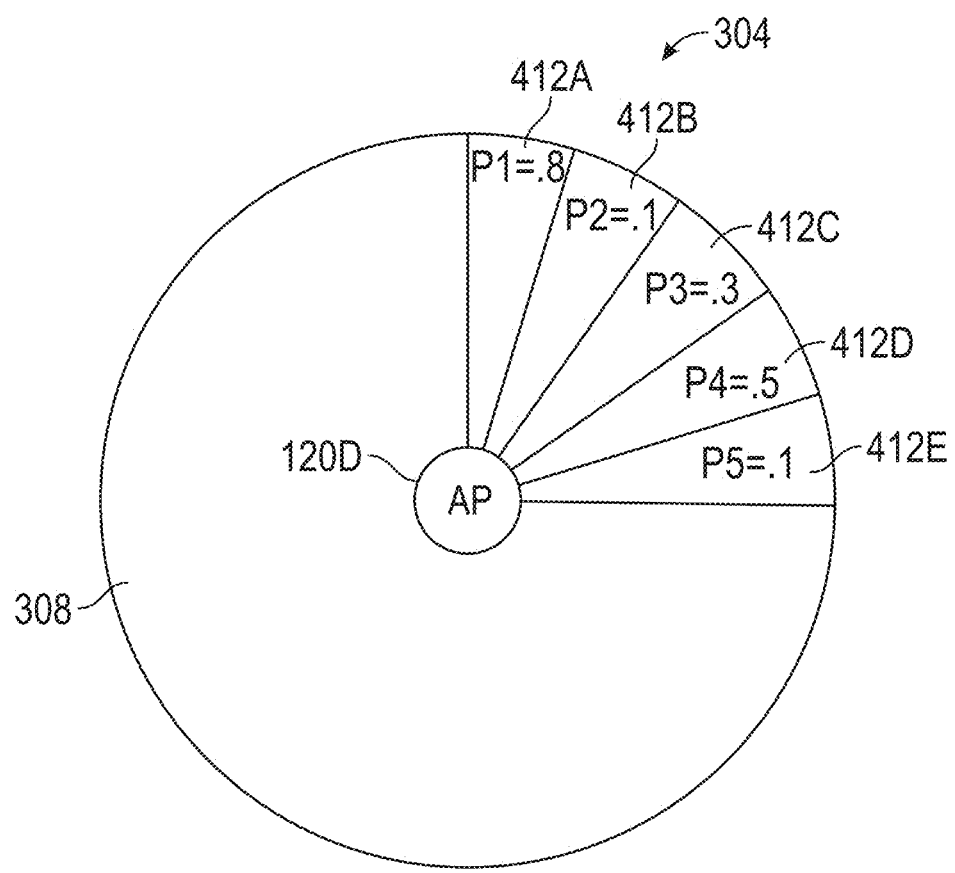
FIG. 4 shows as set of segments in a restricted search area in which a device signal is received in accordance with aspects of the present disclosure.

An embodiment of how the AP 120 may provide data to the location server 0105 may be a shown in FIG. 4. The restricted area 304 may be divided into five different segments 412A through 412E. The AP 120 may determine the AoA or the most likely AoAs by determining a probability, as shown in FIG. 4. The probability can be a weight or measure of the strength of the signal or perceived strength of the signal in each of the different segments 412A-412E. The AP 120 may report a subset of the various segments 412A through 412E. For example, the location server 105 may establish a setting for the number of segments or predicted segments that the AP 120 is to report. For example, the location server 105 can determine and instruct that the three most probable segments, e.g., the three segments with the highest weights or probabilities, will be reported to the location server 105. Thus, a smaller set of data is communicated between AP 120 and the location server 105 to determine the location of a device 155 in location 200.

Figure 5:
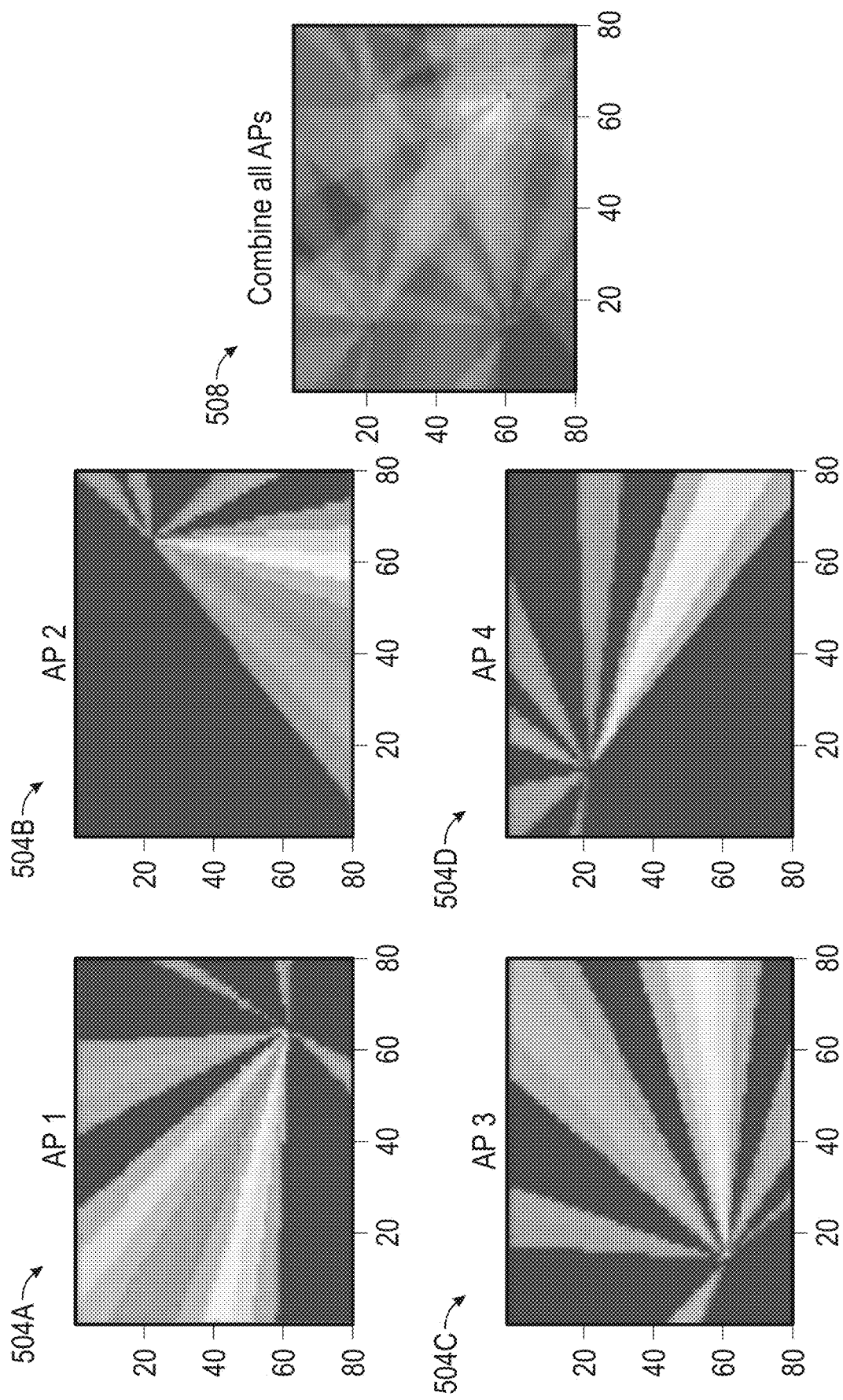
FIG. 5 shows visual representations of the segments provided to the location server and a heat map generated from that information provided to the location server in accordance with aspects of the present disclosure.

Examples of the output from various APs 120 may be as shown in FIG. 5. For example, each AP 120 may provide a set of segments that are represented by the bands shown in FIGS. 504A-504D. The brightness of the band, for example, light grey, represents a higher probability that the signal from the device 155 arrived at that AOA. Thus, each AP 120 may provide a limited set of AOA information restricted to the area defined by the location server 105 for that AP 120 and restricted to a number of AOA's required from the AP 120.

The location server 105 may then combine this information from the APs 120 to form a heat map, for example, heat map 508. Thus, the combination of the various AOA information can be quickly assimilated into a heat map 508 that indicates with relative accuracy the location of the device 155 within location 200. This heat map 508 provides the most probable location of the device 155 and may send this physical position to other services or devices for use in other applications.

Figure 6A:
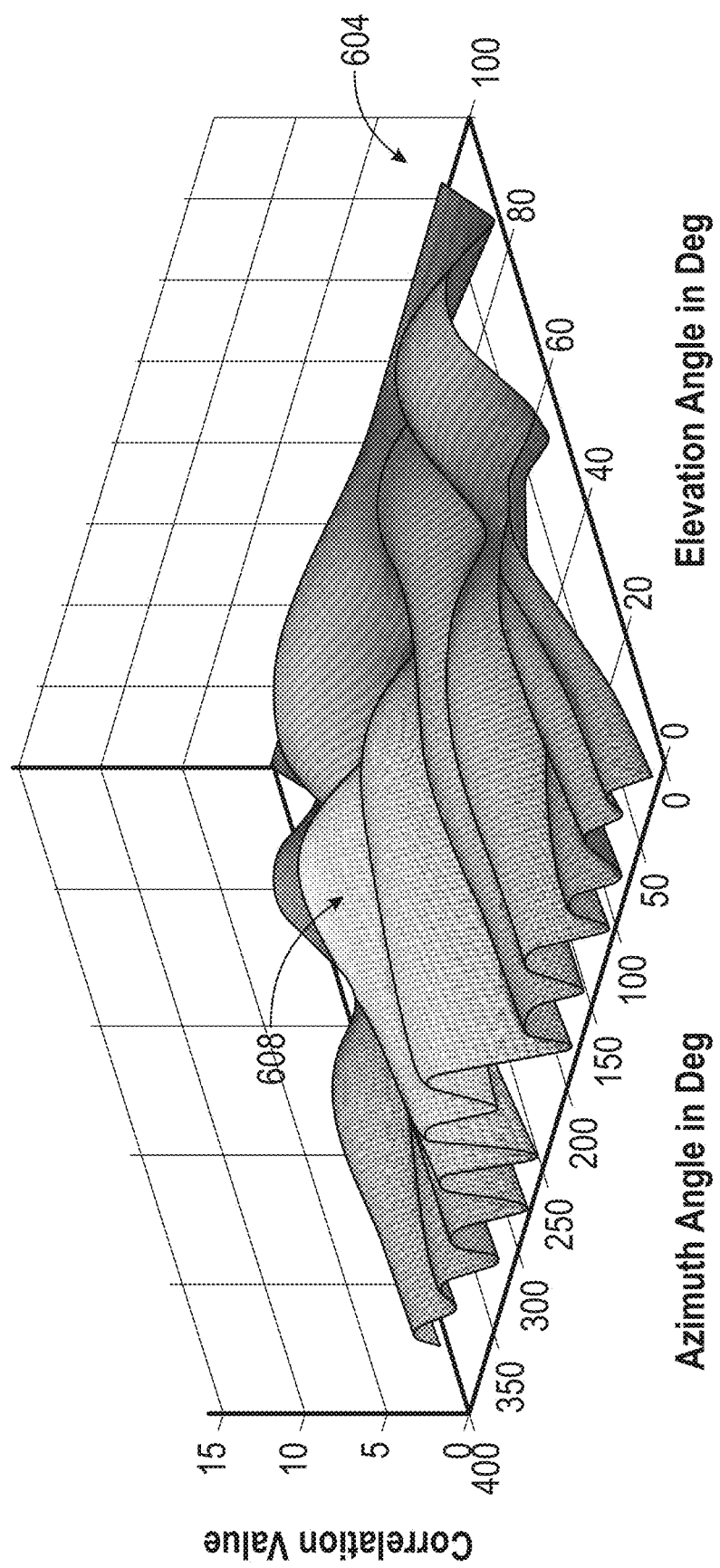
FIG. 6A shows a visual representation of a heat map in accordance with aspects of the present disclosure.
Figure 6B:
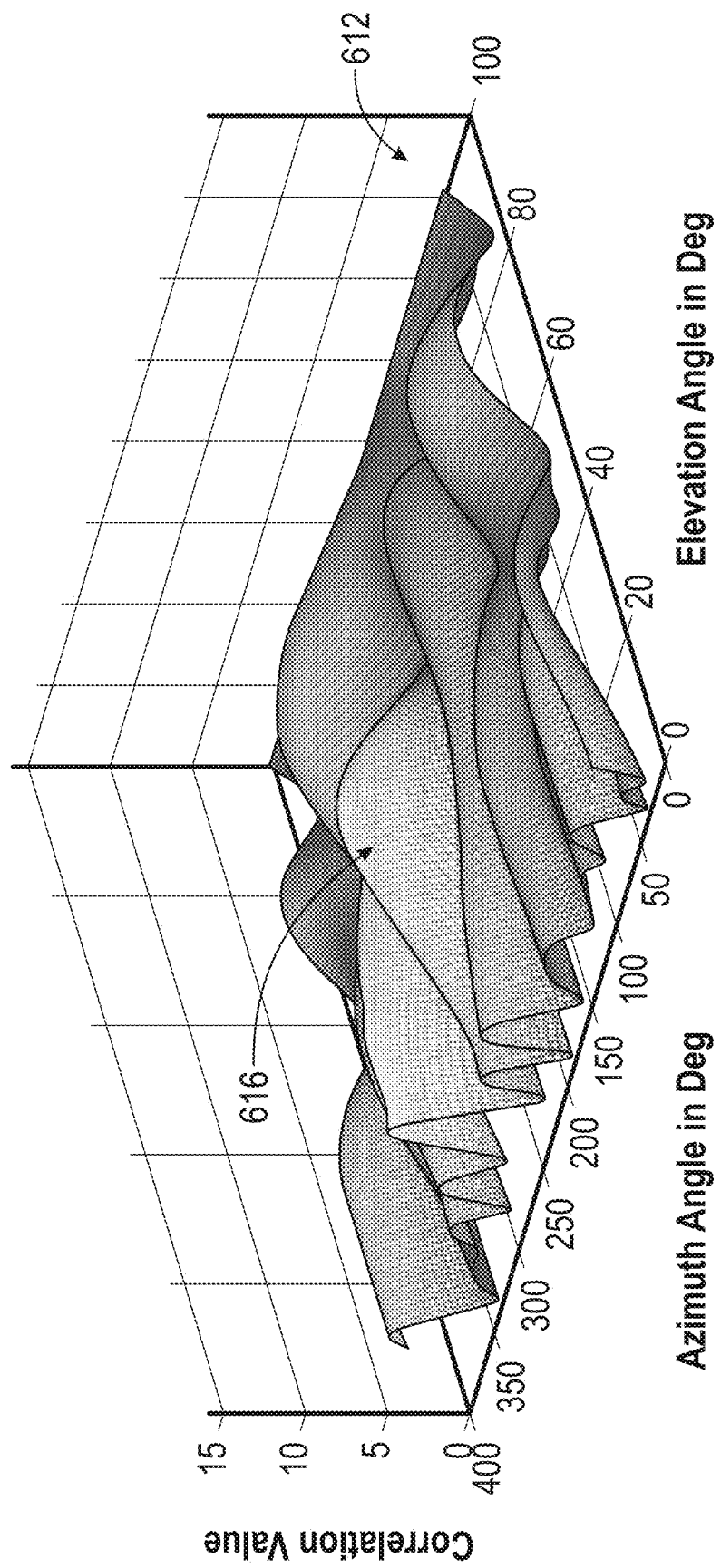
FIG. 6B shows another visual representation of a heat map in accordance with aspects of the present disclosure.

FIG. 6A a shows a far-field AoA correlation results 604, which can represent a likely location 608 of a device 155 based on the information received by the APs 120. The far-field AoA correlation results 604 can include both an azimuth angle and an elevation in degrees. The higher the three-dimensional bump, for example, at location 608, the more likely they device 155 is at that location. As such, the location server 105 can produce a relatively complex view of the location of the device 155 based off of the reduced set of AOA information received from the APs 120. The near-field AoA correlation results 612 derived from the location information may be as shown in FIG. 6B. These near-field AoA correlation results 612 also shows a hump 616 in the three-dimensional image, which is similarly located to what was shown previously in FIG. 6A. As such there is little difference in the far-field AoA correlation results 604 and the near-field AoA correlation results 612.

Figure 7:
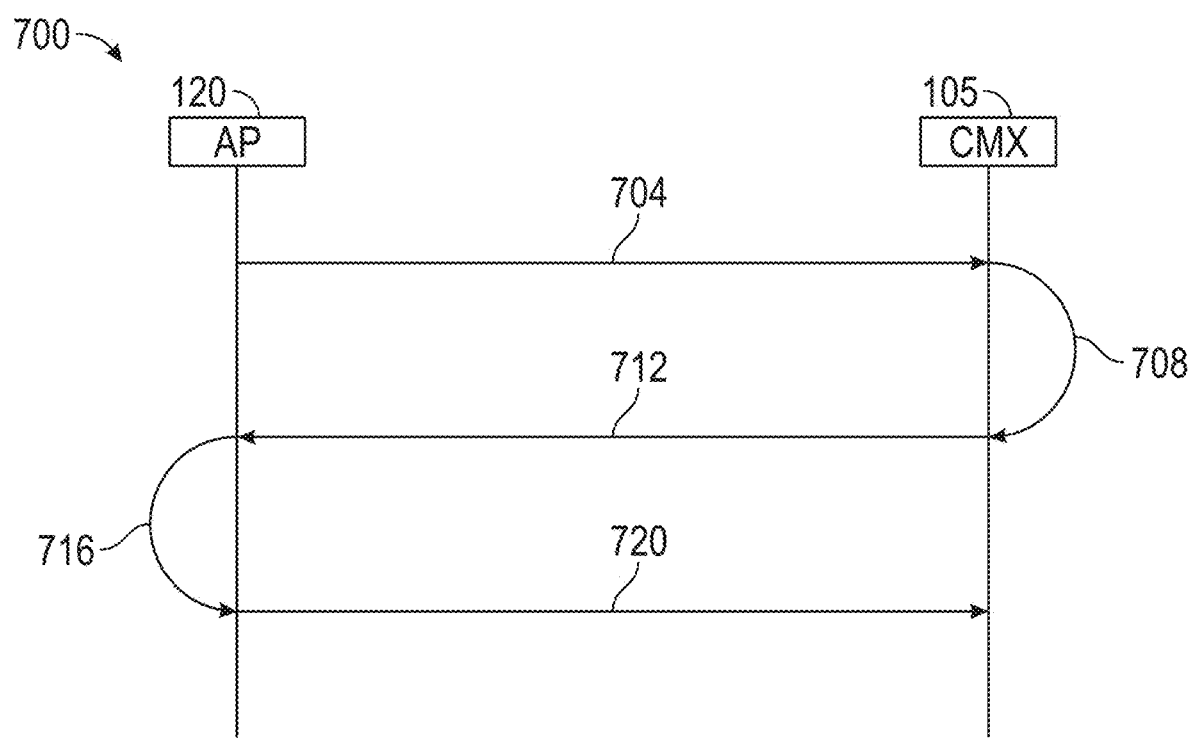
FIG. 7 shows a signaling diagram in accordance with aspects of the present disclosure.

FIG. 7 is a signalling diagram 700 that shows the communications between the AP 120 and the location server 105. The signals may be sent in various stages to determine the location of a device 155 within area 200. An AP 120 can send location information in signal 704. This initial signal(s) 704 can provide initial location information from other devices to allow the location server 105 to determine the restricted area 304 in process 708. This previous location information, used to determine the restricted area, is then composed into a directive to the AP 120 in signal 712 and sent to the AP 120.

From the information in signal 712, the AP 120 can restrict the portion of the location 200 analyzed to locate device 155. The location determination for a new device 155 can occur in stage 716. The AOA information from this determination may be sent in signal 720 back to the location server 105. The information in signal 720, from the various APs 120, can be used to compose the heat map 508.

Figure 8A:
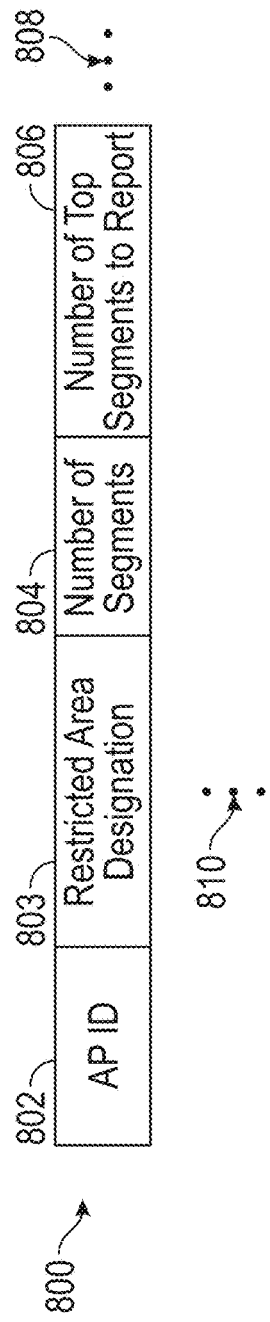
FIG. 8A shows a data structure stored, sent, received, or retrieved to determine a location of a user device in accordance with aspects of the present disclosure.

FIG. 8A is a data structure 800 that may be an example of the data included in signal 712. The data structure 800 can include one or more of, but is not limited to an AP Identifier (ID) 802, a restricted field designation 803, a number of segments designation 804, and/or a number of top segments 806 to report. The data structure 800 can include more or fewer fields than those shown in FIG. 8A, as represented by ellipses 808. Further, each AP 120, in the location 200, can be sent a data structure 800, and thus, there may be more data structures provided than that shown in FIG. 8A, as represented by ellipses 810, based on the number of APs 120 in the location 200.

The AP ID 802 can represent any type of identifier that uniquely identifies the AP 120 from other APs 120 in the network 110. Thus, the AP ID 802 can be a numeric ID, and alphanumeric ID, an Internet Protocol (IP) address, a Media Access Control (MAC) address, or some other address or ID used by the location server 105 to send the signal 712 to the AP 120 and recognize which AP 120 is sending the AoA information in signal 720.

The restricted field designation 803 can be an identification or designation of the azimuth angles for which the AP 120 should monitor for the device 155. As explained previously, past AoA determinations from the APs 120 may be limited to a certain and identifiable portion of the possible azimuth angles. As was shown in conjunction with FIGS. 3A and 3B, an AP 120 may not be able to receive signals from a device 155 in some portion of the AP's area of coverage because of the physical environment in which the AP 120 operates. For example, the AP 120 may be in a corner of a room and can only receive signals from an approximately 90° portion of the 360° coverage area. The location server 105 can provide an indication or designation of the restricted area 803 to the AP 120. The designation may be a set of segment IDs or a set of azimuth angles to review, for example, 0° to 90°.

The restricted area 803 may be determined in various ways. First, the location server 105 may store past AoA determinations. After some threshold number of AoA determinations are received from the AP 120, for example, 100 determinations, the location server 105 can identify a set of continuous segments that are not received by the AP 120. That continuous set of segments may then be designated as the portion of the AP's azimuth that is not to be analyzed. In other configurations, a user may provide the restricted area as an input to the location server 105, either manually or through some type of measurement at the AP 120.

The number of segments 804 may be a definition of the number different portions into which the 360° azimuth or restricted area should be separated. The number of segments 804 may be provided as a number, e.g., 20, or as a number of degrees, e.g., 30°. Regardless, the number of segments 804 determines the desired granularity for the location determination and may be influenced by how the location determination is to be used. As such, the number of segments 804 may be automatically set, predetermined at a factory, or set by a user.

The number of top segments 806 is a definition of the number of segments, to which the AoA of the signal from the device 155 is detected, should be provided back to the location server 105. Thus, the AP 120 may determine the signal strength in every segment 312 in the restricted area 304. The AP 120 may send all the values for the signal strength in those segments or may send a subset of the segments, as is defined by the number of top segments 806. For example, the location server 105 may only designate the top three segments. In this situation, the AP 102 may send the three segments that have the greatest signal strength or weight 818 for that AoA.

Figure 8B:
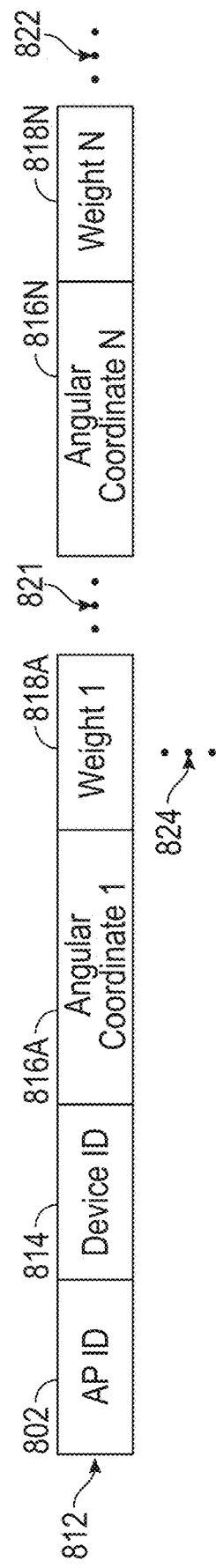
FIG. 8B shows another data structure stored, sent, received, or retrieved to determine a location of a user device in accordance with aspects of the present disclosure.

FIG. 8B is another data structure 812 that may be an example of the data included in signal 720. The data structure 812 can include one or more of, but is not limited to the AP ID 802, a device ID 814, an angular coordinate 1 816A, a weight 1 818A, an angular coordinate N 816N, and/or a weight N 818N. The data structure 812 can include one or more sets of angular coordinate 816 and weight 818, as represented by ellipses 821. The data structure 812 can include more or fewer fields than those shown in FIG. 8B, as represented by ellipses 822. Further, each AP 120 in the location 200 can send a data structure 812, and thus, there may be more data structures provided than that shown in FIG. 8A, as represented by ellipses 824. The AP ID 802 may be as previously described with data structure 800, and thus, will not be explained further.

The device ID 814 can represent any type of identifier that uniquely identifies the device 155 from other devices in the network 110. Thus, the device ID 814 can be a numeric ID, and alphanumeric ID, an Internet Protocol (IP) address, a MAC address, a phone number, or some other address or ID used by the AP 120 and location server 105 to identify the device 155 for location services with the AP 120 and the location server 105.

The angular coordinate 816 (referring to angular coordinate 1 816A, angular coordinate N 816N, etc.) is an identifier of the segment 412 at which the AoA of the device signal is received. The angular coordinate 816 can be an identifier of the segment 412, for example, a Globally Unique Identifier (GUID), a numeric ID, an alphanumeric ID, etc. Thus, each segment 412 may have a predetermined identifier assigned thereto by the AP 120 or location server 105 and agreed to by the AP 120 and the location server 105. In other configurations, the angular coordinate 816 is the degrees, within a 360° system, that represent the location of the segment 412, for example, 40° to 60°. Regardless, the angular coordinate 816 allows the segment to be identified by the AP 120 and the location server 105.

The weight 818 (referring to weight 1 818A, weight N 818N. etc.) is a probability or value that indicates a rating or ranking for the angular coordinate 816, associated with the weight 818, compared to the other angular coordinates 816.

For example, as shown in FIG. 4, the weight 818 may be a value, for example, between 1 and zero, which indicates the strength of signal when received in that segment 412. The weight 818 can be any value in a predetermined value range. Regardless of how the weight 818 is calculated, the weight 818 allows the AP 120 to determine which segment 412 represents the most likely direction(s) from which the device signal was received.

Figure 8C:
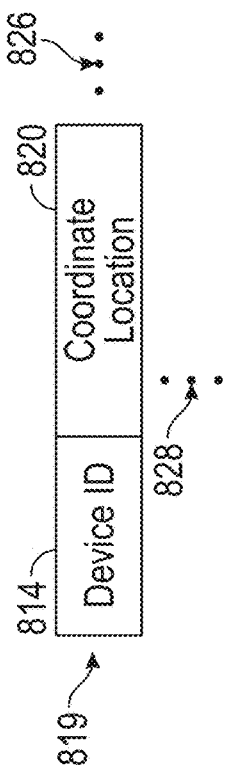
FIG. 8C shows another data structure stored, sent, received, or retrieved to determine a location of a user device in accordance with aspects of the present disclosure.

FIG. 8C is another data structure 819 that may be an example of the data determined by and provided from the location server 105. The data structure 819 can include one or more of, but is not limited to, the device ID 814 and a coordinate location 820. The data structure 819 can include more or fewer fields than those shown in FIG. 8C, as represented by ellipses 826. Further, each device 155 in the location 200 can have a different location, and thus, there may be more data structures 819 provided than that shown in FIG. 8C, as represented by ellipses 828. The device ID 814 may be as previously described with data structure 812, and thus, will not be explained further.

The coordinate location 820 can be a determined location of a device 155 as calculated by the location server 105 from the sets of angular coordinates 816 and weights 818 from the set of APs 120. The coordinate location 820 can be derived from a heat map 508 or other determination or calculation. The location 200 may be associated with a coordinate system, for example, the coordinate system shown in heat map 508. The determined location 820 of the device 155 can be overlaid on this coordinate system. Thus, the coordinates of this location may become the coordinate location 820. Regardless, the coordinate location 820 represents any X, Y, and/or Z coordinates, or other type of location description that can be useful to the location server 105 or those applications/services using the location provided by the location server 105.

Figure 9:
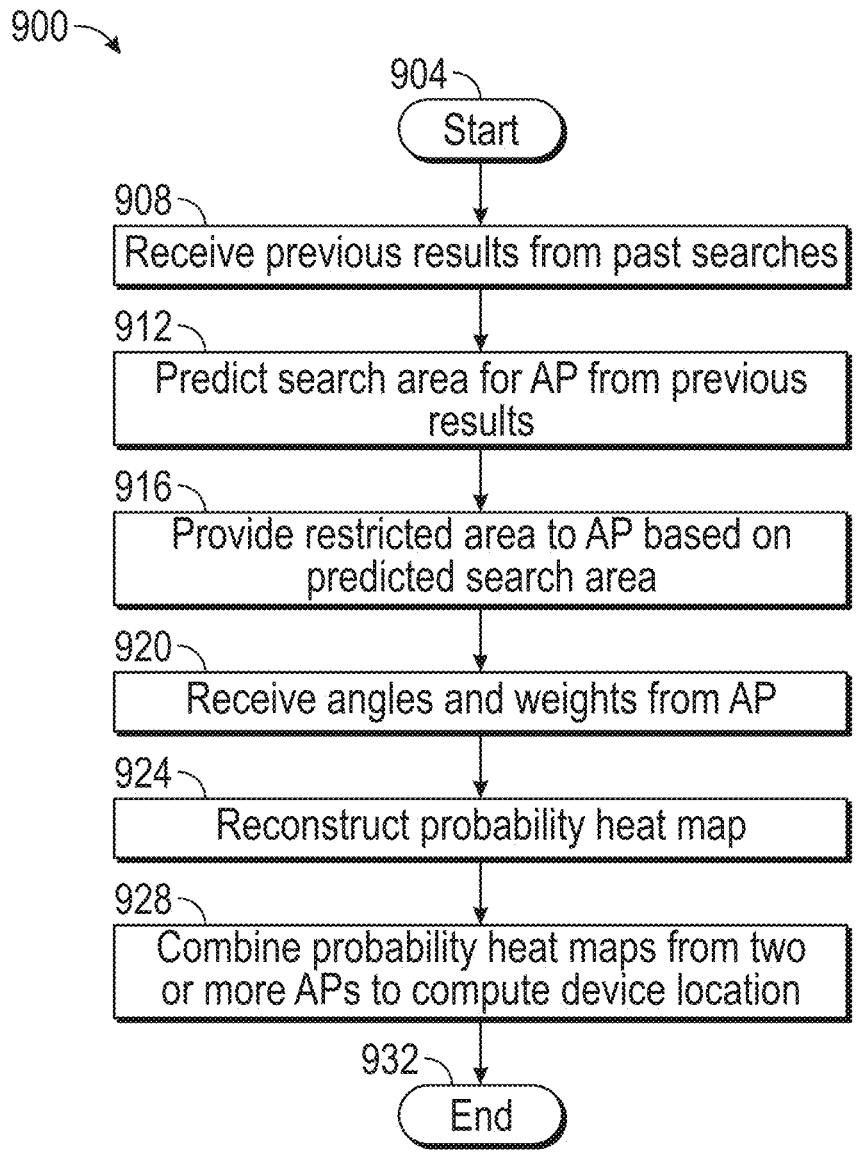
FIG. 9 is a method, conducted by a location server, for determining a location of a user device in accordance with aspects of the present disclosure.

An embodiment of a method 900, as conducted by the location server 105, for determining a location of a user device 155 may be as shown in FIG. 9. A general order for the stages of the method 900 is shown in FIG. 9. Generally, the method 900 starts with a start operation 904 and ends with an end operation 932. The method 900 can include more or fewer stages or can arrange the order of the stages differently than those shown in FIG. 9. The method 900 can be executed as a set of computer-executable instructions executed by a computer system and encoded or stored on a computer readable medium. Further, the method 900 can be performed by gates or circuits associated with a processor, an Application Specific Integrated Circuit (ASIC), a Field Programmable Gate Array (FPGA), a System-On-Chip (SOC), or other hardware device. Hereinafter, the method 900 shall be explained with reference to the systems, components, devices, modules, software, data structures, heat maps, methods, etc. described in conjunction with FIGS. 1-8 and 10-11.

The location server 105 can receive, from at least one of the APs 120 connected to the network 110, a location determination result as signal 704, in stage 908. This result may be associated with a past search. These past search results or past location determinations may be saved by the location server and associated with the AP 120 that provided the information. In at least some configurations, after some number of results are received, the location server 105 can determine the area(s) 308 where the AP 120 is receiving signals from a device and the area(s) 304 where the AP 120 is receiving signals from devices. The results of past searches in a determined area, where signals are being received, can predict the restricted area 304, in stage 912.

From this information, the restricted area determination function 212 of the location server 105 can generate the restricted area designation, which limits the AP 120 to a determination of AoA information to a range less than 360°.

Further, in some configurations, the location server 105 may also send a number of segments designation 804 that instructs the APs 120 how many segments into which to divide the restricted area. For example, the restricted area may be 90° divided into 10° segments. Further, the location server 105 can send a number of top segments to report 806 back to the location server 105. The number of top segments can be less than the segments in the restricted area. For example, the location server 105 can instruct the AP 120 to send the top three segments.

The location server 105 may then form signal 712 to send to the APs 120, in stage 916. Then, the location server 105 can receive a signal 720 from an AP 120, in stage 920. The signal 720 can include the angular coordinate 816 and weight 818 associated with a segment of azimuths associated with AoA for a received signal at the AP 120. In at least some configurations, the location server 105 receives the angular coordinate 816 and weight 818 for two or more segments from the AP 120 and/or angular coordinate 816 and weight 818 from two or more APs 120. The number of segments received from each AP 120 may be predetermined by the number of top segments to report 806 sent by the location server 105.

From the angular coordinate 816 and weight 818 in the AoA information data structure 812, the location server 105 can generate a heat map identifying the location of the user device, in stage 924. The heat map 504 may be as shown in FIG. 5. The heat maps 504 from numerous APs 120 may then be combined by the location server 105 into a probability heat map 508, as shown in FIG. 5, which indicates the device location in the location 200, in stage 928. This coordinate location may be provided to other services or devices that require the location to provide functionality to the user or others.

Figure 10:
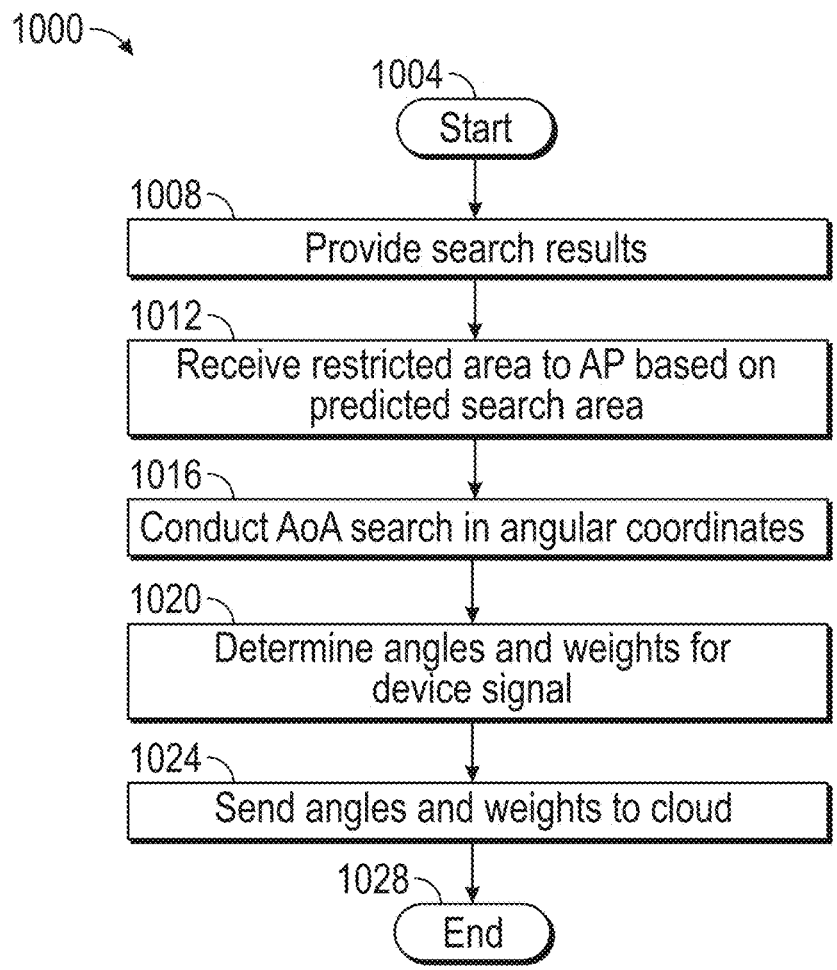
FIG. 10 is a method, conducted by an AP, for determining a location of a user device in accordance with aspects of the present disclosure.

An embodiment of a method 1000, as conducted by an AP 120, for determining a location of a user device 155 may be as shown in FIG. 10. A general order for the stages of the method 1000 is shown in FIG. 10. Generally, the method 1000 starts with a start operation 1004 and ends with an end operation 1028. The method 1000 can include more or fewer stages or can arrange the order of the stages differently than those shown in FIG. 10. The method 1000 can be executed as a set of computer-executable instructions executed by a computer system and encoded or stored on a computer readable medium. Further, the method 1000 can be performed by gates or circuits associated with a processor, an ASIC, a FPGA, a SOC, or other hardware device. Hereinafter, the method 1000 shall be explained with reference to the systems, components, devices, modules, software, data structures, heat maps, methods, etc. described in conjunction with FIGS. 1-9 and 11.

The AP 120 can send to the location server 105 location determination results, as signal 704, in stage 1008. This results may be previously sent and associated with a past search. These past search results or past location determinations may be saved by the location server and associated with the AP 120 that provided the information. In at least some configurations, after some number of results are received, the location server 105 can determine the area(s) 308 where the AP 120 is receiving signals from a device and the area(s) 304 where the AP 120 is receiving signals from devices. The results of past searches in a determined area, where signals are being received, can predict the restricted area 304. From this information, the restricted area determination function 212 of the location server 105 can generate the restricted area designation, which limits the AP 120 to a determination of AoA information to a range less than 360° determining. The AP can receive the restricted area designation 803 from the location server 105, in stage 1012.

Further, the AP 120 can receive a number of segments designation 804, wherein the number of segments designation 804 indicates to the AP 120 how many segments the restricted area 304 should be divided into for determining the AoA information. There can be two or more segments 312 in the restricted area 304. Still further, the AP 120 may receive a number of top segments designation 806 from the location server, wherein the number of top segments designation 806 indicates how many segments of angular coordinates 816 and weights 818 are to be reported by the AP 120 to the location server 105. The number of top segments 806 can be less than the segments 804 in the restricted area 304.

Based on the above restrictions and designations, the AP 120 can conduct an AoA search of a signal being received from a user device, in stage 1016. Thus, the AP 120 determines AoA information, such as an angular coordinate 816 and a weight 818, for each segment 412 in the restricted area 304. The AP 120 can determine the AoA information as any azimuth in a 360° range around the AP 120. Generally, the AP 120 determines an angular coordinate 816 and a weight 818 for the device signal, in stage 1020. The weight 818 can be a probability that the signal was received in that segment 312. The AP 120 can use the weight to rank order the segments that received the signal to provide the top segments. Thereinafter, the AP 120 forms signal 720 with the angular coordinate 816 and weight 818 for each segment reported for the AoA information. The signal 720 is then sent to the location server 105 from the AP 105, in stage 1024.

Accordingly, aspects of the present disclosure comprise a method comprising: determining, by an Access Point (AP) in a network, an Angle of Arrival (AoA) information of a first signal from a user device; generating a second signal having the AoA information, and sending the second signal to a location server, wherein the location server determines the physical location of the user device based at least on the AoA information and a position of the AP.

Any of the one or more above aspects, wherein the AP determines the AoA information as an azimuth in a 360° range around the AP.

Any of the one or more above aspects, wherein the AP receives, from the location server a restricted area designation, wherein the restricted area designation limits the determination of the AoA information to a range less than 360°.

Any of the one or more above aspects, wherein the restricted area designation is based on a past location determination.

Any of the one or more above aspects, wherein the AP receives a number of segments designation, wherein the number of segments designation indicates to the AP how many segments the restricted area should be divided into for determining the AoA information.

Any of the one or more above aspects, wherein there are two or more segments in the restricted area.

Any of the one or more above aspects, wherein the AoA information comprises an angular coordinate and a weight.

Any of the one or more above aspects, wherein the AP receives a number of top segments designation from the location server, wherein the number of top segments designation indicates how many segments of angular coordinates and weights are to be reported by the AP.

Any of the one or more above aspects, wherein the number of top segments is less than the segments in the restricted area.

Any of the one or more above aspects, wherein the weight is a probability that the first signal was received in that segment, and wherein the weight enables the AP to rank order the segments to provide the top segments.

Further, aspects of the present disclosure further comprise a method comprising: receiving, by a location server, two or more signals, having Angle of Arrival (AoA) information from two or more Access Points (APs) associated with a location of a user device, based on the AoA information, generating a heat map identifying the location of the user device; from the heat map, determining a coordinate location of the user device; and providing the coordinate location.

Any of the one or more above aspects, wherein the location server sends, to each of the two or more APs, a restricted area designation, wherein the restricted area designation limits the determination of the AoA information to a range less than 360°.

Any of the one or more above aspects, wherein the restricted area designation is based on a past location determination.

Any of the one or more above aspects, wherein the location server sends, to each of the two or more APs, a number of segments designation, wherein the number of segments designation indicates to each AP how many segments the restricted area should be divided into for determining the AoA information.

Any of the one or more above aspects, wherein the number of top segments is less than the segments in the restricted area.

Further, aspects of the present disclosure further comprise a system comprising: a network; an Access Point (AP) in communication over the network, the AP comprising: a memory storage; and a processing unit coupled to the memory storage, wherein the processing unit is operative to: determine an Angle of Arrival (AoA) information of a first signal from a user device; generate a second signal having the AoA information, and send the second signal to a location server; an location server in communication with the AP over the network, the location server comprising: a second memory storage; and a second processing unit coupled to the second memory storage, wherein the second processing unit is operative to: receive the second signal, having the AoA information from the AP, based on the AoA information, generating a heat map identifying a location of the user device; from the heat map, determining a coordinate location of the user device; and providing the coordinate location.

Any of the one or more above aspects, wherein the AP receives, from the location server a restricted area designation, wherein the restricted area designation limits the determination of the AoA information to a range less than 360°, wherein the restricted area designation is based on a past location determination.

Any of the one or more above aspects, wherein the AP receives a number of segments designation, wherein the number of segments designation indicates to the AP how many segments the restricted area should be divided into for determining the AoA information, wherein there are two or more segments in the restricted area.

Any of the one or more above aspects, wherein the AP receives a number of top segments designation from the location server, wherein the number of top segments designation indicates how many segments of angular coordinates and weights are to be reported by the AP, wherein the number of top segments is less than the segments in the restricted area.

Any of the one or more above aspects, wherein the weight is a probability that the first signal was received in that segment, and wherein the weight enables the AP to rank order the segments to provide the top segments.

Any of the one or more above aspects, wherein the AP determines the AoA information as an azimuth in a 360° range around the AP.

Figure 11:
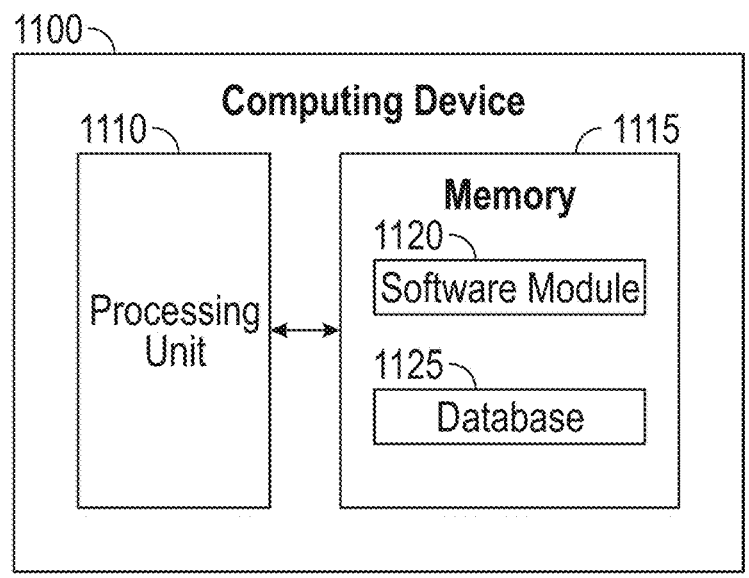
FIG. 11 shows a block diagram of a computer or computing device for conducting or executing the methods and processes for determining a location of a user device in accordance with aspects of the present disclosure.

FIG. 11 shows computing device 1100. As shown in FIG. 11, computing device 1100 may include a processing unit 1110 and a memory unit 1115. Memory unit 1115 may include a software module 1120 and a database 1125. While executing on processing unit 1110, software module 1120 may perform, for example, processes for determining an AoA of a device signal, sending that AoA to a cloud server, or determining a coordinate location of that device based on at least the received AoA, including for example, any one or more of the stages from method 900 or method 1000 described above with respect to FIG. 9 and FIG. 10. Computing device 1100, for example, may provide an operating environment for elements of operating environment 100 including, but not limited to, location server 105, router 115, AP 120, and user device 155. Elements of operating environment 100 (e.g., location server 105, router 115, AP 120, and user device 155) may operate in other environments and are not limited to computing device 1100.

Computing device 1100 may be implemented using a Wireless Fidelity (Wi-Fi) access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 1100 may comprise any computer operating environment, such as hand-held devices, multi-processor systems, microprocessor-based or programmable sender electronic devices, minicomputers, mainframe computers, and the like. Computing device 1100 may also be practiced in distributed computing environments where tasks are performed by remote processing devices. The aforementioned systems and devices are examples and computing device 1100 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a Random Access Memory (RAM), a read-only memory (ROM), an Erasable Programmable Read-Only Memory (EPROM or Flash memory), an optical fiber, and a portable Compact Disc Read-Only Memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' steps or stages may be modified in any manner, including by reordering steps or stages and/or inserting or deleting steps or stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a SOC where each or many of the element illustrated in FIG. 1 may be integrated onto a single integrated circuit. Such a SOC device may include one or more processing units, graphics units, communications units, system virtualization units and various application functionality all of which may be integrated (or "burned") onto the chip substrate as a single integrated circuit. When operating via a SOC, the functionality described herein with respect to embodiments of the disclosure, may be performed via application-specific logic integrated with other components of computing device 400 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   determining, by an Access Point (AP) in a network, an Angle of Arrival (AoA) information of a first signal from a user device;
   generating a second signal having the AoA information, and
   sending the second signal to a location server, wherein the location server determines a physical location of the user device based at least on the AoA information and a position of the AP wherein the AP determines the AoA information as an azimuth in a 360° range around the AP and wherein the AP receives, from the location server, a restricted area designation, wherein the restricted area designation limits the determination of the AoA information to a restricted area with a range less than 360°.

2. The method of claim 1, wherein the restricted area designation is based on a past location determination.

3. The method of claim 1, wherein the AP receives a number of segments designation, wherein the number of segments designation indicates to the AP how many segments the restricted area should be divided into for determining the AoA information.

4. The method of claim 3, wherein there are two or more segments in the restricted area.

5. The method of claim 4, wherein the AoA information comprises an angular coordinate and a weight.

6. The method of claim 5, wherein the AP receives a number of top segments designation from the location server, wherein the number of top segments designation indicates how a number of top segments, including angular coordinates and weights, are to be reported by the AP.

7. The method of claim 6, wherein the number of top segments is less than the segments in the restricted area.

8. The method of claim 7, wherein the weight is a probability that the first signal was received in that segment, and wherein the weight enables the AP to rank order the segments to provide the number of top segments.

9. A method comprising:
   receiving, by a location server, two or more signals, having Angle of Arrival (AoA) information from two or more Access Points (APs) associated with a location of a user device wherein the location server sends, to each of the two or more APs, a restricted area designation, wherein the restricted area designation limits the determination of the AoA information to a restricted area with a range less than 360°;
   based on the AoA information, generating a heat map identifying the location of the user device;
   from the heat map, determining a coordinate location of the user device; and
   providing the coordinate location.

10. The method of claim 9, wherein the restricted area designation is based on a past location determination.

11. The method of claim 10, wherein the location server sends, to each of the two or more APs, a number of segments designation, wherein the number of segments designation indicates to each AP how many segments the restricted area should be divided into for determining the AoA information.

12. A system comprising:
a network; and
an Access Point (AP) in communication over the network, the AP comprising:
a memory storage; and
a processing unit coupled to the memory storage, wherein the processing unit is operative to:
determine an Angle of Arrival (AoA) information of a first signal from a user device;
generate a second signal having the AoA information, and
send the second signal to a location server, wherein the AP receives, from the location server a restricted area designation, wherein the restricted area designation limits the determination of the AoA information to a restricted area of segments with a range less than 360°, wherein the restricted area designation is based on a past location determination.

13. The system of claim 12, further comprising the location server in communication with the AP over the network, the location server comprising:
a second memory storage; and
a second processing unit coupled to the second memory storage, wherein the second processing unit is operative to:
receive the second signal, having the AoA information from the AP,
based on the AoA information, generating a heat map identifying a location of the user device;
from the heat map, determining a coordinate location of the user device; and
providing the coordinate location.

14. The system of claim 12, wherein the AP receives a number of segments designation, wherein the number of segments designation indicates to the AP how many segments the restricted area should be divided into for determining the AoA information, wherein there are two or more segments in the restricted area.

15. The system of claim 12, wherein the AP receives a number of top segments designation from the location server, wherein the number of top segments designation indicates how many of a number of top segments, including angular coordinates and weights, are to be reported by the AP, wherein the number of top segments is less than the segments in the restricted area.

16. The system of claim 15, wherein the weight is a probability that the first signal was received in that segment, and wherein the weights enable the AP to rank order the segments to provide the number of top segments.

* * * * *